No. 759,180. PATENTED MAY 3, 1904.
T. J. HUBBELL.
PLOW.
APPLICATION FILED DEC. 11, 1901.
NO MODEL.

WITNESSES
Chas. L. Hyde.
W. D. Reed

INVENTOR
Thomas J. Hubbell
BY Hazard & Harpham
ATTORNEYS

No. 759,180.

Patented May 3, 1904.

UNITED STATES PATENT OFFICE.

THOMAS J. HUBBELL, OF POMONA, CALIFORNIA.

PLOW.

SPECIFICATION forming part of Letters Patent No. 759,180, dated May 3, 1904.

Application filed December 11, 1901. Serial No. 85,500. (No model.)

*To all whom it may concern:*

Be it known that I, THOMAS J. HUBBELL, a citizen of the United States, residing at Pomona, in the county of Los Angeles, State of California, have invented new and useful Improvements in Plows, of which the following is a specification.

My improvements are primarily designed for subsoil-plows, but they are applicable to plows generally, other than sidehill-plows.

The objects of my improvement are to provide a plow on which the operator may ride and which is easily drawn, which can be easily adjusted to enter or come out of the ground, which can be easily adjusted while moving to plow at different depths and retain the heel or landside-bar parallel with the plow-beam or to remove and retain the plow above the surface of the soil. I accomplish these objects by the plow described herein and illustrated in the accompanying drawings, in which—

Figure 1:
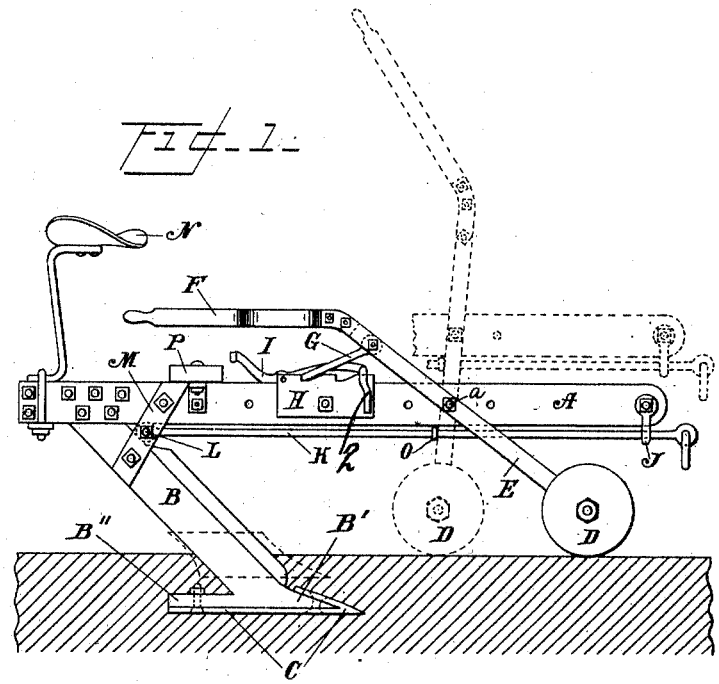
Figure 2:
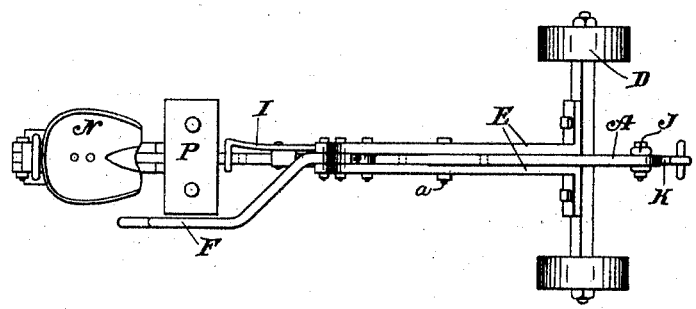

Figure 1 is a side view of my improved plow. Fig. 2 is a plan of the same.

In the drawings, A is the plow-beam, to the rear end of which is affixed the standard B, the lower end of which is turned partly forward to form a point-receiving abutment B' and partly backward to form a heel-bar or landside B''.

C is a combined slip-point and heel-bar reinforcement which is removably connected to the abutment and to the heel-bar, which sustains the usual wear on these parts and which may be easily removed when worn out and replaced.

D is a wheeled truck, to the axle of which are bolted at *a* two attaching-bars E, which pass on each side of the beam to which they are pivotally connected. Normally these bars incline rearwardly and are provided with a rearwardly-projecting handle F, by means of which the positions of the bars and truck are changed, whereby to regulate the depth in the ground to which the plow is to penetrate. Pivoted to these bars above the beam is dog G, which engages with detent H, adjustably mounted on the beam to retain the bars and truck in their adjusted positions. To detent H is pivoted the foot-lever I, which aids in securing the proper adjustment of the dog in the detent, as by placing the foot on the lever the dog may be kept from engaging with the detent until the proper notch is reached. It is only used when lowering the handle. This lever I is provided with a downwardly-bent portion 2 at its end, extending at an angle to the body portion of the lever, and the end of the lever, together with bent portion 2, is located beneath the dog G, the member operating to guide the lever in its movement and serving as a counterpoise to normally retain the lever in its lowered position, as shown in Fig. 1. To the front end of the beam is the depending clevis J, through which passes the draft-rod K, which is pivotally connected by bolt L to brace-bars M, which are bolted to the beam and to the standard, there being one on each side thereof. Affixed to the rear end of the beam is a seat N, in which the operator sits when plowing.

P is a foot-rest.

In the operation of my plow the draft-animals are attached to the draft-rod in the usual manner. As the draft-rod passes through a clevis affixed on the front of the beam in front of the truck and as the attaching-bars normally project rearwardly from the axle of the truck, the beam and the bottom of the plow must always be parallel with the surface of the ground under normal conditions. When it is desired to alter the depth of the plow in the ground, it can easily be done by operating the lever F to raise or lower the truck, thereby changing the position of the dog in the detent, which may be accomplished while the plow is moving. I have illustrated the detent with only two teeth; but it may have as many as desired. When it is desired to transport the plow from one field to another, this can be accomplished by throwing the truck back under the beam, as shown by dotted lines in Fig. 1, so that it is back of the pivot which attaches it to the beam, whereupon the plow will ride above the surface of the ground, a stop O on the draft-rod being provided to keep the truck from projecting too far backward of the pivot at *a*. If desired, a turning-share, moldboard, and landside may be bolted to the standard of the subsoil-plow, as shown by dotted lines in Fig. 1. The truckattaching bars may be pivotally affixed to the beam near the front end thereof, and the truck may project rearwardly under the beam to the rear of the pivot which joins the bars to the beam, and the handle attached to the bars will project rearwardly, so as to be convenient to the operator. In this construction the dog and detent must be arranged to hold the handle against an upward pull, and the handle would be pulled downward to regulate the plow.

Having described my invention, what I claim as new, and desire to secure by Letters Patent, is—

1. A plow comprising a beam, and standard, a truck located beneath the beam, the truck comprising an axle and wheels carried thereby, separate attaching-bars pivoted to the beam on either side thereof, the lower ends of the bars secured to the truck, a rearwardly-projecting handle secured to the bars, a clevis stationarily secured to the beam and a draft-rod passing through and supported by the clevis, the draft-rod extending rearwardly and being itself pivotally secured to the plow.

2. A plow comprising a standard, a beam to which the standard is secured and means for raising and lowering the standard and beam, the means comprising a wheeled member, attaching-bars secured thereto, the bars pivotally secured to the beam, a pivoted dog carried by the bars, a notched plate secured to the beam with which plate the dog normally engages and means for raising the dog to release it from engagement with the plate, the means comprising a foot-lever independent of the plate and dog, the lever pivoted to the beam and adapted to engage the dog to raise the latter.

3. A plow comprising a standard, a beam to which the standard is secured, and means for raising and lowering the standard and beam, the means comprising a truck, attaching-bars secured thereto and pivotally attached to the beam, a notched plate, a pivoted dog normally engaging the plate to retain the truck in its adjusted position, an independent releasing-lever pivotally secured to the notched plate, one end of the lever provided with a guide and counterpoise adapted to engage the dog to release it from the plate.

4. A plow comprising a standard, a beam to which the standard is secured and means for raising and lowering the beam and standard, the means consisting of a wheeled member, attaching-bars secured to the member and pivotally attached to the beam, means for retaining the wheeled member in a plurality of adjusted positions, a pivotally-supported draft-rod and a stop carried by the draft-rod beneath the beam with which stop the attaching-bars contact to limit the movement of the wheeled member in one direction.

In witness that I claim the foregoing I have hereunto subscribed my name this 12th day of November, 1901.

THOMAS J. HUBBELL.

Witnesses:
  G. E. HARPHAM,
  MATTIE MCGINNIS.